United States Patent [19]
Antoine

[11] Patent Number: 5,312,652
[45] Date of Patent: May 17, 1994

[54] PROCESS FOR FORMING A COPOLYMER-BASED ANTICORROSION COATING ON A METAL SURFACE AND THE PRODUCTS THUS OBTAINED

[75] Inventor: Philippe Antoine, Avignon, France

[73] Assignee: Sollac, Puteaux, France

[21] Appl. No.: 893,842

[22] Filed: Jun. 4, 1992

[30] Foreign Application Priority Data

Jun. 4, 1991 [FR] France ................. 91 06752

[51] Int. Cl.$^5$ ............................... B05D 3/00
[52] U.S. Cl. .................. 427/387; 427/388.1; 427/421; 427/428; 106/14.05; 106/14.41; 428/457
[58] Field of Search ............ 427/405, 409, 412.5, 427/387, 388.1, 421, 422, 435, 428; 428/457; 106/14.05, 14.41

[56] References Cited

U.S. PATENT DOCUMENTS

| 3,459,691 | 8/1969 | Ostrowski et al. . |
| 3,565,851 | 2/1971 | Neuroth . |
| 3,644,566 | 2/1972 | Kincheloe et al. . |
| 3,933,407 | 1/1976 | Tu et al. .............................. 427/387 |
| 4,148,838 | 4/1979 | Martin . |
| 4,971,863 | 11/1990 | Hart .................................. 427/412.5 |
| 5,089,336 | 2/1992 | Kumar et al. ....................... 428/452 |
| 5,112,413 | 5/1992 | Carey et al. ....................... 427/409 |
| 5,151,297 | 9/1992 | Robbins et al. ..................... 427/406 |

FOREIGN PATENT DOCUMENTS 0205827 12/1986 European Pat. Off. .
0275051 7/1988 European Pat. Off. .

Primary Examiner—Anthony McFarlane
Attorney, Agent, or Firm—Oblon, Spivak, McClelland, Maier & Neustadt

[57] ABSTRACT

The process is characterised according to the invention by the application to the metal surface, especially sheet metal, of a layer of a solution comprising a block copolymer made up of at least two blocks, the first consisting of a unit based on a siloxane monomer and the second consisting of a unit based on acrylic or vinyl monomers.

17 Claims, 1 Drawing Sheet

PROCESS FOR FORMING A COPOLYMER-BASED ANTICORROSION COATING ON A METAL SURFACE AND THE PRODUCTS THUS OBTAINED

BACKGROUND OF THE INVENTION

1. Field of the Invention

The present invention relates to a process for forming a coating on a previously pickled metal surface, especially on a metal sheet, and the product obtained by this process, the coating consisting of copolymers based on polydimethylsiloxane imparting anticorrosion and lubricating properties to the surface.

2. Discussion of the Background

The problem of protection of metal surfaces and more particularly of metal sheets against atmospheric corrosion is a continual preoccupation in industry.

In fact, after the operations of hot rolling of flat products and of cold rolling with a view to reducing their thickness, the metal sheets obtained are subjected to a pickling operation and are then stored in a depot or transported to a customer. The metal sheets are then directly subjected to the effects of the environment and corrode as time passes before reaching the user.

It is accepted that atmospheric corrosion represents by far the most important corrosion factor. It acts through the intermediacy of a very thin film of water condensed on the surface of the metal sheets, this film containing chemical species in solution which originate from the atmosphere. The corrosion which arises in this film is of the electrochemical type.

In order to avoid this type of "electrochemical" attack the sheet metal must be isolated from the environment by being coated with a material which is impervious and resistant to this medium such as, for example, by means of oiling. It is also appropriate to endow the surfaces of the metal sheets with a potential for chemical reactivities contrary to those which cause the corrosion.

At present, some products intended for a delayed use are delivered to the customers oiled, the oiling of the products taking place only at the end of the production line, immediately after the pickling. In this case, as soon as the products are received by the customers, the latter must degrease their surfaces before envisaging any use whatsoever.

It is therefore understandable that it is highly advantageous to protect metal sheets temporarily against corrosion for a minimum period of two months while getting rid of the oiling which results in an additional operation by the customer. This period corresponds to the "dead time" between the finishing of the product and its being received by the customer.

Among the known methods for protecting unoiled pickled products can be mentioned corrosion inhibitors, for example amine-based ones, coatings based on a plastic, such as resins or elastomers, and metallic or inorganic coatings.

The major disadvantage linked with the use of conventional anticorrosion products lies in the fact that they exhibit a corrosion resistance which is very limited in time, namely about twenty days. After that, they are no longer effective, the corrosion phenomenon appears and deteriorates the metal sheets.

In another technical field, which is that of the forming of metals by cold plastic deformation, especially by stamping of metal sheets, it is known that the contribution of the frictional forces between a metal sheet and a tool during the deformation represents from 20 to 40% of the total energy absorbed by the operation and is converted entirely into heat energy.

Furthermore, since the deformations applied to the metal sheet are produced under very high pressures during very short times, frictions appear between the metal sheet and the tool during the operation, thus giving rise to adhesions or seizures, that is to say tearing away of metal particles. In extreme cases the sheet metal reaches the limit with mechanical rupture.

Attempts are consequently made to reduce the metal sheet-tool friction coefficient by employing a solid or liquid lubricant which is placed on the sheet metal and/or on the tool and which forms an antifriction layer. It prevents direct contact between the sheet metal to be deformed and the tool and thus reduces the friction.

There are known surface treatments for sheet metal which make it possible to improve the friction coefficient and thus to contribute to a better cold deformation.

Phosphating, in particular, is one of these treatments and the use of zinc phosphates is known to improve the quality of cold deformations. However, phosphating is a chemical conversion process, that is to say that it impairs the chemical properties of the surface of the sheet metal. Now, when the deformation of the sheet metal has been completed, it is possible, depending on the intended industrial application, to apply a chemical treatment to the sheet metal and, when this takes place, reaction incompatibilities may arise and may consequently be detrimental to the performance of the said treatment. In addition, when phosphated metal sheets are to be welded, problems appear as a result of the peculiar behaviour of the sheet metal towards welding products.

There are also known products which are deposited onto a metal sheet with a view to improving the cold deformability of the said sheet, in particular to improve its stamping ductility. In particular, Patent Application FR-88/05334 describes alkali metal salts such as, for example, potassium phosphate, $K_3PO_4$, which has lubricating properties when mixed with a lubricating oil at the time of the stamping.

SUMMARY OF THE INVENTION

Faced with the disadvantages and the limitations of the prior art, the present invention is intended to provide a coating for metal surfaces, especially of metal sheets, making it possible to contribute an improved temporary protection against corrosion and to lower the friction coefficient of the surface, as well as the process for applying the coating onto the latter.

DETAILED DESCRIPTION OF THE PREFERRED EMBODIMENTS

The subject of the invention is a process for forming a coating on a metal surface, especially on a metal sheet, characterised by the application to the said surface of a layer of a solution containing a block copolymer made up of at least two blocks, the first consisting of a unit based on a siloxane monomer, and the second consisting of a unit based on acrylic or vinyl monomers.

The siloxane monomer is especially dimethylsiloxane. In this case the copolymers employed according to the invention are based on polydimethylsiloxane. The first block may also contain an acrylic or vinyl monomer in addition to the siloxane monomer.

According to a characteristic of the invention the acrylic monomer forming part of the first and/or second block is chosen from methacrylic esters.

The methacrylic esters are preferably chosen from methyl methacrylate, butyl methacrylate and hydroxyethyl methacrylate.

Figure 1:
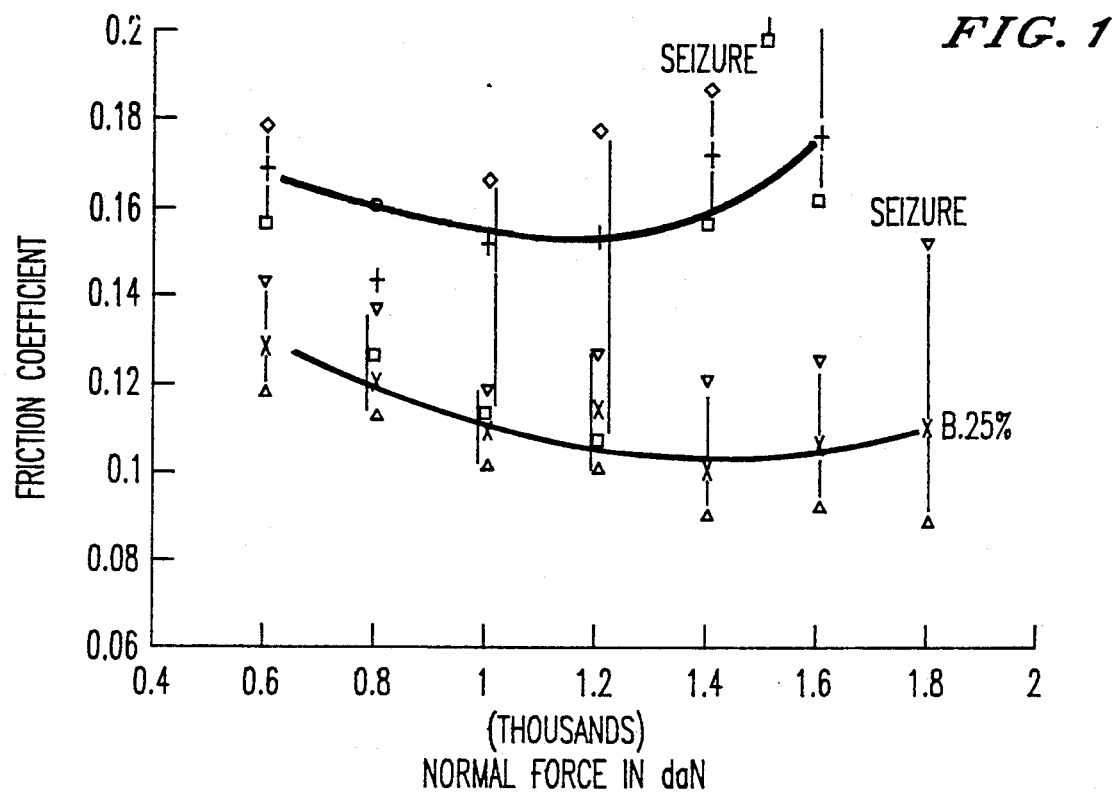
FIGS. 1 and 2 show the friction coefficient versus normal force for sheet metal coated with a solution comprising the invention copolymer.

A typical copolymer according to the invention comprises (i) a first block made up of three monomers: methyl methacrylate, hydroxyethyl methacrylate and dimethylsiloxane, whose proportions by weight in the said block are between 30 and 50%, 0 and 20%, 40 and 60% respectively and (ii) a second block made up of three monomers: methyl methacrylate, butyl methacrylate and hydroxyethyl methacrylate, whose proportions by weight in the said block are between 30 and 50%, 30 and 50% and 10 and 30% respectively.

This copolymer preferably comprises (i) a first block made up of the monomers methyl methacrylate, hydroxyethyl methacrylate and dimethylsiloxane, whose proportions by weight in the said block are equal to 40, 10 and 50% respectively, the block (i) representing 60% by weight of the copolymer, (ii) a second block made up of the monomers methyl methacrylate, butyl methacrylate and hydroxyethyl methacrylate, whose proportions by weight in the said block are equal to 40, 40 and 20% respectively, the block (ii) representing 40% by weight of the copolymer.

The solvent is chosen from ketones, esters, chloroalkanes and aromatic compounds. These organic compounds have a low surface tension and are chosen for the purpose of avoiding differences in miscibility and to obtain a dispersion of the copolymer in these solvents which is as homogeneous as possible.

Among ketones, acetone, methyl ethyl ketone or cyclohexanone are preferably chosen.

Among esters, ethyl acetate or butyl acetate is preferably chosen.

Among chloroalkanes, 1,1,1-trichloroethane is preferably chosen.

Among the aromatic compounds, toluene or xylene is preferably chosen.

The solution advantageously contains from 2 to 10 g/l of copolymer.

According to a characteristic of the invention the solution is preheated before being applied onto the metal sheet. The heating temperature is in particular between 20 and 400° C.

The application of the layer to the metal surface, especially the face of the sheet metal, may be performed in various way:
 by spraying with a gun,
 by dipping,
 by rotation,
 by coating with a paintbrush, brush or roller,
 by enamelling as a strip.

According to another characteristic of the process according to the invention, the protective layer is dried after its application to the metal surface. The drying temperature is in particular between 70 and 100°C., depending on the solvent employed, for example approximately 80 C.

Another subject of the invention is the product obtained by the process described above.

Within the scope of this invention the product may be a metal sheet. The layer applied to the sheet has a thickness of between 0.01 $\mu$m and 3 $\mu$m. The layer preferably has a thickness of 0.1 $\mu$m.

The invention will be understood better with the aid of the description which is to follow and which is given solely by way of example.

The process according to the invention, relating to the formation of a coating on a metal surface, applies to a metal sheet which is pickled beforehand, but can also apply to a metal sheet which is previously coated (by phosphating, chromating and the like).

The process is implemented on a treatment line, for example starting with a cold-rolled sheet.

The process also applies to a hot-rolled sheet.

The metal surface may be a wire.

EXAMPLE

Before carrying out the process according to the invention the sheet metal is subjected to a pickling operation in acidic baths, for example in nitric acid, in order to remove the chemical substances which adhere to the surface and which would thereby interfere with the subsequent application of a coating. The sheet metal is then immersed in troughs of rinsing water to remove all traces of acid.

A layer of a solution comprising the following is applied to at least one face of the pickled sheet metal: copolymer comprising:
(i) a first block made up of three monomers methyl methacrylate, hydroxyethyl methacrylate and a dimethylsiloxane, whose proportions by weight are 40, 10 and 50% respectively, the block (i) representing 60% by weight of the copolymer,
(ii) a second block made up of three monomers methyl methacrylate, butyl methacrylate and hydroxyethyl methacrylate whose proportions by weight in the said block are 40. 40 and 20% respectively, the block (ii) representing 40% by weight of the copolymer, and solvent defined below.

The acrylic monomers employed according to the invention have a solubility which is higher than that of the siloxane monomer.

The solubility parameter is defined in the "Polymer Handbook" by J. Bandrup (publ. Wiley Interscience 1976).

In the case of the dimethylsiloxane group the solubility parameter has a value of 7.5 $(cal/cm^3)^{\frac{1}{2}}$; the solubility parameters of methyl methacrylate, hydroxyethyl methacrylate and butyl methacrylate respectively assume the following values: 10, 11, 10 $(cal/cm^3)^{\frac{1}{2}}$ respectively, which are thus higher than that of dimethylsiloxane.

Such a copolymer is known as a component of mixtures based on polyurethane resins and elastomers and also as a surface modifier for powders which form part of the composition of paint pigments.

According to the invention is has been possible to ascertain that copolymers comprising a polydimethylsiloxane exhibit a good adhesion to metal sheets.

In this embodiment of the invention the chosen solvent is 1,1,1-trichloroethane. Because of its low boiling point, 74.1° C. at normal atmospheric pressure, this solvent can be evaporated with a low energy, when compared with other industrial solvents.

The solution of the copolymer in trichloroethane is applied in the form of a layer onto the metal sheet at a temperature of 30°C. This heating makes it possible to homogenise the solution and thus to improve the dissolution of the copolymers present.

In a final stage of the process a drying operation is performed on the layer immediately after it has been applied to the sheet metal. The drying is performed by means of hot air driers at approximately 80° C.; this temperature is higher than the boiling temperature of the solvent in order to facilitate its evaporation.

The process described above makes it possible to obtain a product which is a metal sheet coated with the copolymer according to the embodiment of the invention.

The organic coating layer thus obtained has a thickness of 0.1 $\mu$gm.

The organic coating endows the metal sheet with properties which make it possible to improve its corrosion resistance. It is nonporous, inert towards the corrosive environment, and adheres sufficiently to the sheet metal to prevent water vapour from penetrating the protective screen formed by the coating and initiating a corrosion reaction at the surface of the sheet metal.

Comparative tests have been carried out with conventional, amine-based corrosion inhibitors and have shown a corrosion resistance of at least 60 days in the case of test pieces of metal sheets treated with the copolymer according to the invention, whether the application had been performed by dipping or by rotation.

On the other hand, the corrosion inhibitors were found to be effective up to 20 days, after which period corrosion commenced.

Thus the metal sheets provided with an organic coating as described above can be left in contact with the surrounding air without the customer having to suffer any degradation of the sheets. Furthermore, the customer is relieved of the operation consisting in the removal of the protective oil with which some sheets are coated at present.

In addition, the coating of the sheet metal according to the invention exhibits lubrication properties which are highly advantageous in the field of metal forming by cold plastic deformation, and especially in stamping.

In fact, by virtue of such properties, during the deformation of a metal sheet by a tool, it is possible: to increase the lifetime of the tools, to obtain stamped metal sheets of better quality, especially where the surface quality is involved, to produce articles of complex shapes or to increase the depth of the stamped articles (such articles being difficult to produce, because the technological limit related to the sheet-tool interface is reached and it is no longer possible to modify the operating conditions of the stamping, namely the stamping speed, the shape of the blank and the blank-clamping pressure).

Despite everything, the use of an oil during the stamping is indispensable in order to avoid a seizure.

Tests have been conducted to test the nature of improvement in the friction coefficient of the organic coating, the component taken for comparison being an alkali metal salt and especially potassium phosphate K3PO4, which is known to improve the deformability of a metal sheet.

The tests show a decrease in the friction coefficient of the sheets coated with the organic compound and a retrogression of the technological limits resulting in seizure, these two results contributing to the improvement in the stamping performance such as, for example, the depth of the stamped article.

One of the fundamental characteristics of a metal sheet after a first treatment is that it can undergo a subsequent treatment. In particular, the application of a paint requires the prior preparation of the substrate which it is desired to paint and, more particularly, a metal sheet requires an initial so-called phosphating stage. This stage consists in coating the sheet with an additional microcrystalline film consisting, for example, of zinc, nickel or manganese phosphate a few micrometers in thickness, which is highly adherent to the substrate.

Tests performed in laboratory consisted in subjecting a metal sheet coated beforehand with the copolymer to a complete tricationic phosphating cycle and revealed a completely homogeneous microcrystalline film.

Thus, the treatment of the metal sheet as described in the present invention does not in any way impair the fitness of the sheet for phosphating.

It has been found, advantageously, that the copolymer also exhibits electrical resistance properties, its resistivity being higher than one megaohm meter.

In the class of organic macromolecular compounds which can be employed according to the invention there should also be mentioned the block copolymers made up of dimethylsiloxane and vinylpyridine and the block copolymers made up of dimethylsiloxane and acrylic esters.

For example, the solubility parameter of vinylpyridine is 9.5 $(cal/cm^3)^{\frac{1}{2}}$, making it suitable application according to the invention.

The results of the tests described below make it possible to demonstrate in a significant manner the properties of the metal sheets coated using the process of the invention.

Test 1

The copolymer employed for this test is that described in the example below, and will be coded X.

The test was performed on steel sheet test pieces 50 $\times$ 100 mm in size, to which a layer with a thickness of 0.015 $\mu$m of a solution of 1,1,1-trichloroethane containing a concentration of 1% (w/v) of dissolved copolymer was applied. The application is made by two methods, by dipping and by rotation. According to the first method the test piece is immersed in a bath containing the solution described above. According to the second method the test piece is rotated in a bath containing the same solution.

Other products, for comparison, which are corrosion inhibitors made up of amine groups and commercially available under the names RC305, NAC and MA19 (the products RC305 and MA19 are marketed by Croda Chemicals and NAC is marketed by Quaker) are dissolved in 1,1,1-trichloroethane in concentrations of 0.3 and 0.5% w/v.

They are then applied by spraying onto test pieces.

A test piece which has not undergone any treatment against corrosion is used as a control sample.

All the treated test pieces and the control are exposed to atmospheric corrosion in a storage hall which combines fairly severe conditions: the temperature is of the order of 30° C. and the relative humidity reaches 70%.

The various test pieces are observed for several days, taking into account the visual appearance of the corrosion as a function of time. The visual appearance of the corrosion is scored on a marking scale ranging from 1 to 5, the coefficient 1 being awarded to a test piece on which the first pinholes appear, the coefficient 5 corresponding to the end of the corrosion.

Table 1, which follows, summarises the change in the severity of corrosion with time.

TABLE 1

| PRODUCT | CORROSION START IN DAYS | CORROSION END IN DAYS |
| --- | --- | --- |
| Control | 7 | 12 |
| RC 305 | 22 | 33 |
| NAC | 18 | 25 |
| MA 19 | 14 | 30 |
| X applied by rotation | 65 | 75 |
| X applied by dipping | 120 | 130 |

The results of the tests show us the superiority of the product X according to the invention over the corrosion inhibitors, since the latter display their limits after approximately 30 days, whereas the metal sheets treated with the product X resist corrosion for at least 60 days; after that, at about 65 days, corrosion is initiated and the process of degradation of the metal sheets sets in very rapidly.

Furthermore, the preferred method of application of the copolymer is dipping, as, so to speak, it doubles the protection period.

Test 2

The tests which follow make it possible to single out the influence of the product X according to the invention on the measurement of the friction coefficients of a metal sheet.

Test pieces were treated using the process of the invention, namely in that a layer of a solution of copolymer in 1,1,1-trichloroethane at concentrations of 0.25 and 1% (w/v) respectively were applied to the sheet by dipping.

Friction tests were performed with the aid of a conventional tribometer with parallel surfaces, also known as a plane-plane tribometer.

The oil chosen for the tests is the least lubricating one of the oils employed and is the oil marketed by Shell under the reference 2769E.

As shown by the curve in FIG. 1, attached, when a product which is known for its properties of improving the deformability of metal sheets is employed, such as potassium phosphate in 0.25% solution, the latter seizes at about 1600 daN, whereas the product according to the invention seizes up only at about 1800 daN.

Figure 2:
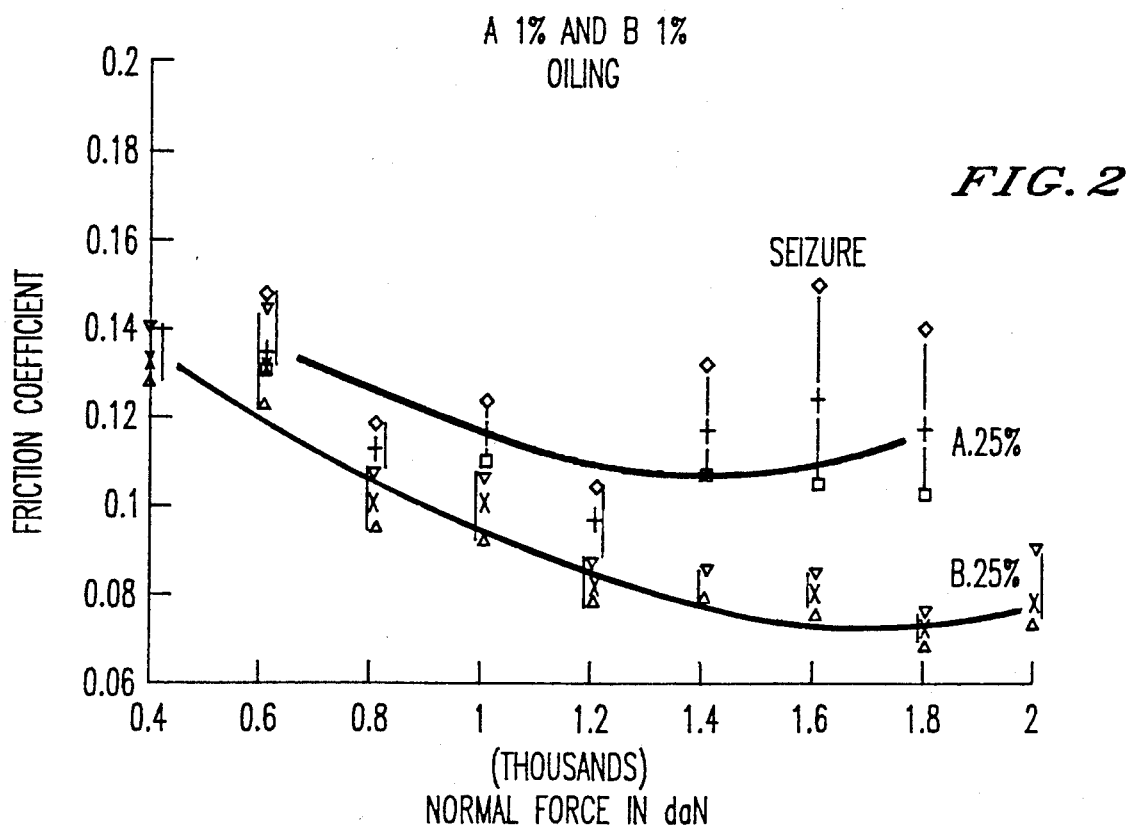

On the curve in FIG. 2, attached, the above two products, which are compared, are in a concentration of 1% in solution and a seizure of the product containing potassium phosphate is found at about 1600 daN whereas at 2000 daN the product X does not yet seize up, the seizure limit being a function of the concentration of product employed.

In FIG. 2, at 1400 daN the product X has a friction coefficient of 0.08 in relation to that containing phosphate, which is 0.11.

Test 3

A metal sheet test piece to which a layer of a 0.3% w/v solution of copolymer in 1,1,1-trichloroethane has been applied by dipping, is subjected successively to a tricationic phosphating cycle:
degreasing
rinsing
fining down
phosphating
rinsing
drying.

Photographs taken with the electron microscope show a phosphate coating made up of uniform and fine crystals of zinc, manganese and nickel, whose distribution is uniform at the surface of the sheet, which is a sign of good phosphating.

What is claimed as new and desired to be secured by Letters Patent of the United States is:

1. A process for imparting protection against corrosion for a minimum period of two months to a metal surface and for decreasing the friction coefficient of said metal surface, comprising coating said metal surface with a layer of a solution comprising a solvent and a block copolymer made up of at least two blocks, the first block being based on a siloxane monomer and the second block consisting essentially of monomers selected from the group consisting of acrylic and vinyl monomers.

2. A process according to claim 1, wherein the siloxane monomer is dimethylsiloxane.

3. A process according to claim 1, wherein the first block consists essentially of a siloxane monomer and acrylic or vinyl monomers and the second block consists essentially of acrylic or vinyl monomers.

4. A process according to claim 1, wherein said acrylic monomers are selected from the group consisting of methyl methacrylate, butyl methacrylate and hydroxyethyl methacrylate.

5. A process according to claim 3, wherein said acrylic monomers of the first block are selected from the group consisting of methyl methacrylate, butyl methacrylate and hydroxyethyl methacrylate.

6. A process according to claim 1, wherein the block copolymer consists of (i) a first block consisting of 30–50 wt % methyl methacrylate, 0–20 wt % hydroxyethyl methacrylate and 40–60 wt % dimethylsiloxane monomers, and (ii) a second block consisting of 30–50 wt % methyl methacrylate, 30–50 wt % butyl methacrylate and 10–30 wt % hydroxyethyl methacrylate.

7. A process according to claim 1, wherein the copolymer consists of (i) a first block which consists of methyl methacrylate, hydroxyethyl methacrylate and dimethylsiloxane, whose proportions by weight in said block are 40, 10 and 50% respectiely, the block (i) representing 60% by weight of the copolymer, and (ii) a second block which consists of methyl methacrylate, butyl methacrylate and hydroxyethyl methacrylate, whose proportions by weight in the said second block are 40, 40 and 20% respectively, the block (ii) representing 40% by weight of the copolymer.

8. A process according to claim 1, wherein said solvent is selected from the group consisting of ketones, esters, chloroalkanes, and aromatic compounds.

9. A process according to claim 1, wherein said solvent is selected from the group consisting of acetone, methyl ethyl ketone and cyclohexanone.

10. A process according to claim 1, wherein said solvent is selected from the group consisting of ethyl acetate and butyl acetate.

11. A process according to claim 1, wherein said solvent is 1,1,1-trichloroethane.

12. A process according to claim 1, wherein said solvent is selected from the group consisting of toluene and xylene.

13. A process according to claim 1, wherein the solution contains from 2 to 10 g/l of copolymer.

14. A process according to claim 1, wherein the solution is heated to a temperature of between 20 and 40° C. before being applied to the metal surface.

15. A process according to claim 1, wherein the coating of said metal surface with a layer of solution is performed by one of the following methods:
   by spraying with a gun,
   by dipping,
   by rotation,
   by coating with a brush or roller,
   by enamelling as a strip.

16. A process according to claim 1, wherein said layer is dried at a temperature of between 70 and 100° C. after coating the metal surface.

17. A coated metal surface obtained by the process according to claim 1, wherein said coating has a thickness of between 0.01 $\mu$m and 3 $\mu$m.